US008655996B2

United States Patent
Sheth et al.

(10) Patent No.: US 8,655,996 B2
(45) Date of Patent: Feb. 18, 2014

(54) CUSTOMIZED BEHAVIOR OF A CONTROL LAYER TOWARDS AN APPLICATION SERVER IN A PACKET-BASED NETWORK

(75) Inventors: Niral Sheth, Austin, TX (US); Arshad Khan, Austin, TX (US); Chaoxin Qiu, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 836 days.

(21) Appl. No.: 12/827,573

(22) Filed: Jun. 30, 2010

(65) Prior Publication Data

US 2012/0005320 A1 Jan. 5, 2012

(51) Int. Cl.
*G06F 15/177* (2006.01)
(52) U.S. Cl.
USPC .......................................... 709/222; 709/228
(58) Field of Classification Search
USPC ........................................................ 709/222
See application file for complete search history.

(56) References Cited

U.S. PATENT DOCUMENTS

| | | | | |
|---|---|---|---|---|
| 7,856,226 B2 * | 12/2010 | Wong et al. | ................. | 455/414.1 |
| 8,131,831 B1 * | 3/2012 | Hu | ................. | 709/223 |
| 2010/0030905 A1 * | 2/2010 | Fikouras et al. | ............... | 709/228 |
| 2010/0150134 A1 * | 6/2010 | Qiu et al. | ...................... | 370/352 |
| 2010/0306349 A1 * | 12/2010 | Shen et al. | ..................... | 709/220 |

\* cited by examiner

*Primary Examiner* — Patrice Winder
*Assistant Examiner* — Eyob Hagos
(74) *Attorney, Agent, or Firm* — Turocy & Watson, LLP

(57) ABSTRACT

System(s) and method(s) are provided for regulating interaction amongst an application layer and a control layer in a packet-based core network. A data structure is provisioned in a centralized repository; the data structure includes (i) at least one procedure for regulating interaction amongst a session control component within the control layer and application server within the application layer, and (ii) an identification (ID) field attribute that uniquely identifies the data structure. To regulate such interaction, the session control component acquires a set of provisioned data structures; acquisition is automatic and can be dictated, in part, by generation of a data structure, or modification of an existing data structure or an ID field attribute. Based at least on an ID field attribute retained in a subscriber service profile, the session control component references a data structure identified by the ID field attribute and implements one or more procedures retained in such data structure. Implementation of the one or more procedure regulates the interaction between the session control component and the application server.

20 Claims, 8 Drawing Sheets

CUSTOMIZED BEHAVIOR OF A CONTROL LAYER TOWARDS AN APPLICATION SERVER IN A PACKET-BASED NETWORK

TECHNICAL FIELD

The subject disclosure relates generally to communication networks and, more specifically, to regulation of interaction amongst an application server a control layer in an internet protocol (IP)-based network, such as an IP Multimedia Subsystem (IMS) network or most any or any packet-based network.

BACKGROUND

Various services in advanced networks, wireless or wireline, rely on packet-based protocols for delivery of data and signaling. Such advanced networks generally exploit a group of application servers that generate at least part of the data and signaling that provide content and enable specific functionality associated with a service, such as voice over internet-protocol (VoIP), IP multimedia content delivery, caller identification (ID) in IP television, etc. In certain architectures, the group of servers is deployed in an application layer, which is functionally coupled to a control layer that typically includes several session control components that enable a service session (e.g., a VoIP call, a data call, delivery of a pay-per-view movie . . . ). An example of such architecture is 3GPP IP Multimedia System (IMS) core network. In $3^{rd}$ Generation Partnership Project (3GPP) IMS core network, a session control component is embodied in a control session control function (CSCF) node, which can be a Serving CSCF (S-CSCF) node, an Interrogating CSCF (I-CSCF) node, a Proxy CSCF (P-CSCF), or a transit function node.

To enable the service session, generally a session control component exploits a predetermined configuration that dictates interaction with one or more application servers in accordance specific criteria that are part of the configuration and are related to the service session and an originating or terminating service subscriber. In addition, the specific criteria dictate, at least in part, routing aspects of the service session. In conventional networks, a network operator typically defines the features of the predetermined configuration. In addition, such predetermined configuration is (i) largely static and specific to a session control component (e.g., S-CSCF node); (ii) substantially manually provisioned; and (iii) generic rather than specific with respect to the various types of ASs that are commonly deployed. As network operators add new service accounts, deploy new technologies that enable additional capabilities for existing services, and put forward new services associated with the new technologies, complexity of the interaction amongst the control layer and the application layer increases rapidly. Thus, in conventional systems, the foregoing aspects of configurations that regulate behavior of a session control component towards an application server can hinder migration towards new network technologies and rich, sophisticated services.

SUMMARY

The following presents a simplified summary of the subject disclosure in order to provide a basic understanding of some aspects thereof. The subject summary is not an extensive overview of the disclosure and it is intended to neither identify key or critical elements of the disclosure nor delineate any scope. The sole purpose of the subject summary is to present some concepts of the disclosure in a simplified form as a prelude to the more detailed description that is presented later.

One or more embodiments of the subject disclosure provide system(s) and method(s) for regulating interaction, and various specific aspects thereof, amongst a control layer component and an application server in a packet-based network, such as an IP-based network of which an IP Multimedia Subsystem (IMS) network and a VoIP network are examples. A data structure is provisioned in a centralized network repository; the data structure includes (i) at least one procedure for interaction amongst a session control component within the control layer and an application server within the application layer, and (ii) a field attribute that uniquely identifies the data structure. To regulate such interaction, and associated specific aspects, the session control component acquires a set of provisioned data structures. Acquisition is automatic and can be dictated, at least in part, by one or more of generation of a data structure, or modification of an existing data structure or an ID field attribute. In addition, based at least on an ID field attribute retained in a subscriber service profile available to the session control component, the session control component references a data structure identified by the ID field attribute and implements one or more procedures retained in such data structure. Implementation of the one or more procedures regulate the interaction, and related specific aspects thereof, amongst the session control component and the application server.

Aspects, features, or advantages of the subject innovation can be exploited in most any or any packet-based core network that provides packet-based service(s) to a subscriber device based at least on session establishment and via an application server.

To the accomplishment of the foregoing and related ends, the disclosure, then, comprises the features hereinafter fully described. The following description and the annexed drawings set forth in detail certain illustrative aspects of the disclosure. However, these aspects are indicative of but a few of the various ways in which the principles of the subject disclosure may be employed. Other aspects, advantages and novel features of the subject disclosure will become apparent from the following detailed description when considered in conjunction with the drawings.

DETAILED DESCRIPTION

Figure 1:
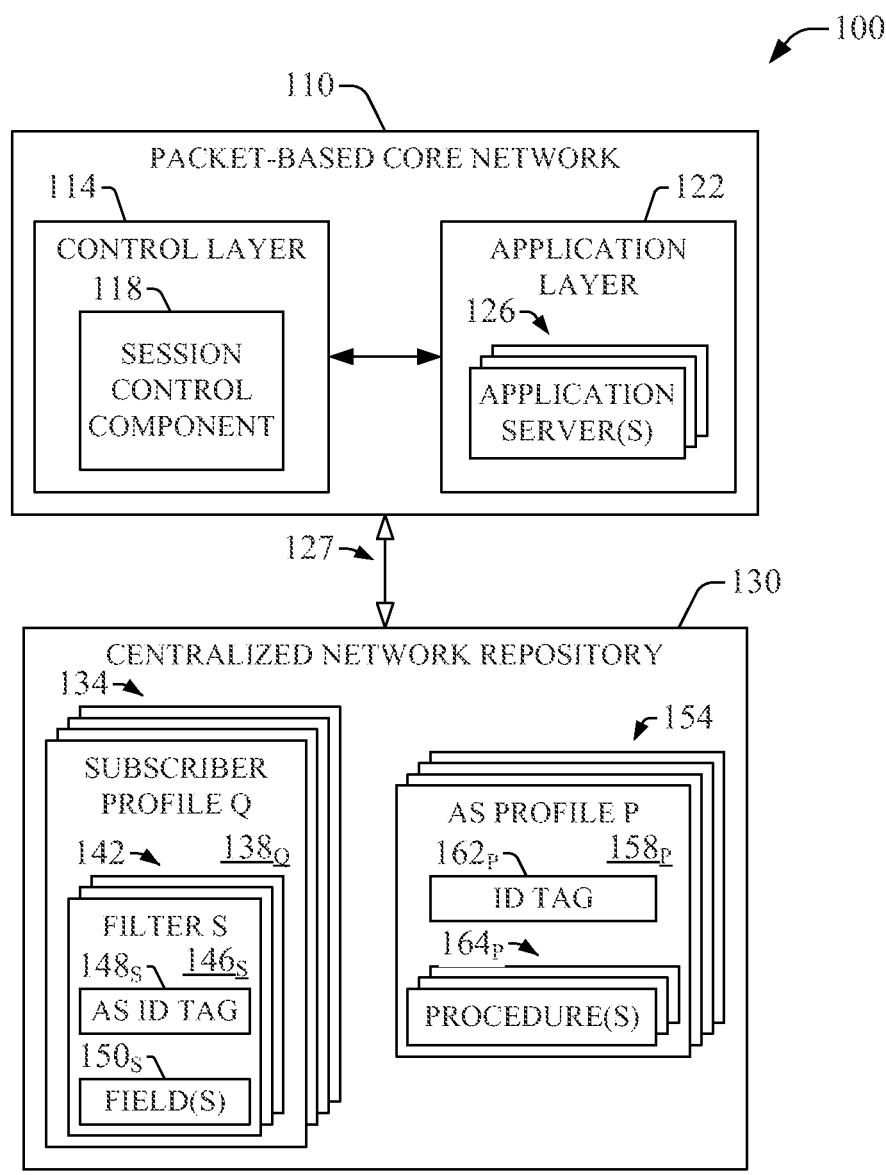
FIG. 1 is a schematic example network system that can operate in accordance with aspects described herein.

The subject disclosure is now described with reference to the drawings, wherein like reference numerals are used to refer to like elements throughout. In the following description, for purposes of explanation, numerous specific details are set forth in order to provide a thorough understanding of the subject innovation. It may be evident, however, that the subject innovation may be practiced without these specific details. In other instances, well-known structures and devices are shown in block diagram form in order to facilitate describing the subject innovation.

As used in this application, the terms "component," "system," "platform," "layer," "node," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration, both an application running on a server or network controller, and the server or network controller can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software, or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. As further yet another example, interface(s) can include input/output (I/O) components as well as associated processor, application, or Application Programming Interface (API) components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Furthermore, in the subject disclosure, the term "set" is intended to refer to groups of one or more entities; for example, a set of data packets refers to one or more data packets. However, as employed herein, the term "subset" can include the empty set unless otherwise noted, as in cases in which, for instance, disclosure of a subset of one or more entities is intended to expressly avoid the empty subset.

Further yet, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms) which can provide simulated vision, sound recognition and so forth.

As described in greater detail below, the various system(s) and method(s) in the subject disclosure provide configuration of service policy(ies) that regulate interaction, and related specific aspects thereof, between a session control component (e.g., a S-CSCF node in 3GPP IMS core network) and at least one application in a set of applications servers 126 within an application layer 122. Such configuration does not rely on customization of subscriber service profile(s) but rather the configuration exploits data structure(s), or data object(s), such as AS profile(s), procedure(s) within the AS profile(s), and ID tag(s) that identify AS profile(s), that are not available in conventional network systems. AS profile(s) are centralized, which affords automation of provisioning of AS profile(s) and related data, such as ID tag(s) and procedure(s) associated with the AS profile(s), to session control component(s). In addition, system(s) and method(s) described herein afford specific usage and acquisition of the foregoing data structure(s). The various aspects or features of the subject disclosure can be exploited to customize interaction amongst most any or any session control component (e.g., a S-CSCF in a 3GPP IMS core network) and a network node that is functionally coupled to the session control component and provides specific service(s) or application functionality to a subscriber device. For instance, such network node can be lawful intercept gateway (LIG), emergency service signaling server (e.g., E-911 signaling server), or the like. It is noted that in the subject disclosure, a subscriber device is an apparatus (user equipment, customer premises equipment, etc.), mobile or otherwise, with wireless or wireline telecommunication functionality.

With reference to the drawings, FIG. 1 is a schematic example network system 100 that can operate in accordance with aspects described herein. A packet-based core network 110 provides a variety of services to a subscriber. The services include numerous packet-based services (e.g., IP-based services) comprising VoIP, video exchange, digital music exchange, digital photograph exchange, IP Television (IPTV) clips, or most any or any packetized digital content. In one or more embodiments, packet-based core network 110 is a 3GPP IMS core network. Service can be provided at least in part via a protocol for session establishment, such as session initiation protocol (SIP) or the H.323 suite of signaling protocols. Packet-based core network 110 includes a control layer 114 that enables session establishment control and routing functionality for service sessions, also referred to herein as sessions. Sessions primarily include data sessions; for example, VoIP call sessions. Control layer 114 can receive signaling that conveys a request to establish a session (call session, data session, etc.) and, in response to such request, routes the session to one or more application servers. In example network system 100, the one or more application servers (ASs) are part of a set of application servers that are deployed within an application layer 122.

To route the session, control layer 114 includes a session control component 118 that acquires (retrieves, receives, etc.) (A) a subscriber profile that contains data specific to a subscriber or subscriber device associated with the session, wherein the data regulates, at least in part, routing to the one or more application servers; and (B) an application server profile. Subscriber profile is also referred to herein as subscriber service profile. The AS profile represents a group of AS instances, which can be instances of the same type of AS. In addition, the AS profile includes data that specifies interaction, and related aspects thereof, amongst the AS profile and the session control component 118 (e.g., a S-CSCF node in 3GPP IMS core network) during session processing (voice call processing, data call processing, etc.). Conventional systems do not provision AS profile(s) as elements that customize routing of a session request associated with a service. In an aspect, the subscriber service profile is linked in a one-to-one relationship with the AS profile, whereas the AS profile can be associated with an application server through a one-to-one, one-to-many, many-to-many relationship. An identification (ID) field attribute (or tag) that uniquely identifies the AS profile provides the linkage between the subscriber service profile and the AS profile; the AS ID field attribute is part of the subscriber service profile and the AS profile. Inclusion of the ID field attribute in the subscriber service profile affords subscriber-device level customization of behavior of the session control component 118 (e.g., S-CSCF node in 3GPP IMS core network) and the AS associated with the AS profile linked to the ID field attribute; thus uniformity of such behavior across application servers is largely mitigated or completely avoided. It should be appreciated that in conventional network systems (e.g., standardized 3GPP IMS core network) the interaction amongst the session control component 118 and an AS is specified primarily by a subscriber profile and is independent of subscriber device that originates a request for service or is a termination point for a request for service. In addition, in conventional network systems, the subscriber profile does not regulate or specify various details of such interaction; in contrast, numerous aspects or features of the subject disclosure regulate details of the interaction amongst the session control component 118 and an AS.

In contrast to conventional network systems, logic that dictates interaction, and related features thereof, amongst the session control component 118 and the one or more ASs is included in the AS profile. Accordingly, and in contrast to conventional network systems, in the subject disclosure, a subscriber service profile does not include procedure(s) that specify interaction amongst the session control component 118 and the one or more ASs. The logic can include at least one procedure comprising one or more sets of computer-executable code instructions, wherein the at least one procedure, in response to execution by at least one processor (not shown in FIG. 1) or at least one component, implements the interaction, and related aspects thereof, amongst the session control component 118 and the one or more ASs. The subscriber service profile can be part of a set of subscriber profiles 134 and the AS profile can be part of a set of AS profiles 154; both the set of subscriber profiles 134 and the set of AS profiles are retained in a memory (not shown) within centralized repository 130. In embodiments in which packet-based core network 110 is a 3GPP IMS core network, session control component 118 can be a S-CSCF node and the centralized network repository 130 can be a Home Subscriber Server (HSS).

Various additional features of subscriber profile(s) and AS profile(s), and acquisition thereof, and routing of a session in accordance with aspects of the subject disclosure are described next.

Data in a subscriber profile (e.g., subscriber profile Q $138_Q$, with Q a positive integer) can include one or more filter criteria that specify features of routing of a session (voice call session, data call session, etc.); in an 3GPP IMS core network, the one or more filter criteria are referred to as initial filter criteria (IFC). In example network system 100, in an aspect of the subject disclosure, the one or more filter criteria are part of a set of filter criteria 142 within the subscriber profile (e.g. subscriber profile Q $138_Q$). The one or more filter criteria establish at least one criterion (type of call, time of call, specific message, etc.) based on which the session control component 118 (e.g., a S-CSCF node in 3GPP IMS core network) routes the session through a group of ASs (e.g., application server(s) 126). The at least one criterion dictates specific invocation of an AS in response to a request for service or session initiation. In addition, the one or more filter criteria can establish the order in which the session control component 118 evaluates such filter criteria. A first portion of the data can control the routing in case the session is originated by a subscriber device and a second portion of the data controls the routing in case the session terminates in the subscriber device. The first portion of data can include a first set of filter criteria (e.g., at least one IFC in 3GPP IMS core network) that determines a first set of ASs that the session control component 118 can invoke, whereas the second portion of data can include a second set of filter criteria that determines a second set of ASs that the session control component 118 can invoke.

In contrast to conventional systems, each filter criterion (e.g., filter criterion $146_S$, also referred to as filter $146_S$) in a subscriber profile (e.g. subscriber profile Q $138_Q$) includes AS identification (ID) field attribute (e.g., ID tag $148_S$) that, as described supra, uniquely indentifies an AS profile (AS profile P $158_P$) in a set of AS profiles 154. The ID field attribute (e.g., ID tag $148_S$) logically points to an associated AS profile (AS profile P $158_P$). Indices S, Q, and P are natural numbers greater than or equal to unity.

A network operator that administers (e.g., owns and manages or leases and manages) packet-based core network 110 can configure the specific ID field attribute (e.g., ID tag $148_S$) to be associated with a filter criterion, such as filter $146_S$. Such configuration can be based on design considerations, such as services provided through the packet-based core network 110, subscriber segment(s) served by the network operator, technology employed in an access network (not shown) to provide a service, or the like. Additionally, a filter criterion (e.g., filter $146_S$, with S a positive integer) can include a group of fields, (e.g., field(s) $150_S$) that can characterize one or more instances of an application server or a group of application servers. For example, one such field can be an AS Uniform Resource Identifier (URI) that can be resolved into multiple instances of an AS to provide fault resilience operation (routing of a session, AS functionality, etc.). In addition, the group of fields can include a first field that identifies, and logically points (e.g., includes a reference to a specific memory address or register) to, an AS and a second field that identifies the AS.

An AS profile (e.g., AS profile $158_S$) is a data structure that includes an ID attribute field (e.g., ID tag $162_P$) and at least one procedure (e.g., set of procedure(s) $164_P$). As described supra, the AS profile is provisioned (e.g., designed and committed to memory storage) to supply at least one procedure to a session control component (e.g., a S-CSCF node in 3GPP IMS core network), wherein the at least one procedure determines at least in part interaction, and specific aspects thereof, of the session control component with at least one AS during session processing. The ID field attribute serves as a logical handle that can be referenced by from a subscriber service profile; thus, the AS profile defines behavior of the session control component toward the at least one AS for a specific subscriber device. A network operator that manages packet-based core network 110 can invoke different services, enabled by different application servers, and allow session control logic, dictated by one or more procedures, to customize interaction with the different AS servers at the subscriber level. In an illustrative scenario, interaction of a session control component 118 (e.g., a S-CSCF in 3GPP IMS core network) with a single AS can be different for a plurality of different subscriber devices—a plurality of subscriber service profiles respectively linked to the plurality of different subscriber devices can identify the single AS but can reference various disparate AS profiles via corresponding ID field attributes. The different subscriber devices can be linked to a single subscriber or to a segment of subscribers of one or more services (e.g., high-speed internet service, wireline telephony, digital multimedia delivery, or the like) provided by the network operator.

In another illustrative scenario, for a first subscriber device, an AS of a first type (e.g., Type I) can be important—e.g., Type I AS provides a desirable feature). In the alternative, for a second subscriber device, an AS of a second type (e.g., Type II) can be critical; for example, AS of Type II provides an application feature that enables adequate operation of the second subscriber device. In addition, for a third subscriber device AS of Type I can be critical while for a fourth subscriber device, AS of Type II can be important. Thus, a network operator that administers packet-based core network 110 can create AS profiles according to relevancy: A first AS profile for critical operation of AS of Type I, a second AS profile for important operation of AS of Type, a third AS profile for second AS of Type II for important, yet not critical, operation; and a fourth AS profile for critical operation of AS of Type II. Such AS profiles can be identified in suitable subscriber service profiles, and can each have different procedures that regulate behavior of a session control component (e.g., S-CSCF node in 3GPP IMS core network) towards AS of Type I and AS of Type II. Thus, provisioning of a group of disparate AS profiles mitigates proliferation of instances of application servers. Moreover, from the foregoing description, a feature termed "profile overloading" emerges, wherein profile overloading represents the capability of associated more than AS profile to a single AS. Profile overloading provides configuration flexibility that is generally unavailable in conventional systems. It should be appreciated that in conventional systems a session control component can re-try access to an AS that provides caller ID over IPTV in the same manner that it retries access to an AS that provides a more critical service for a service session (e.g., voice call). Yet, profile overloading and other aspects or features of the subject disclosure enable configuring a number of re-tries effected for a specific AS in accordance at least with an AP profile associated with the AS.

In addition, the AS profile is agnostic with respect to application server; a field within a subscriber service profile identifies the AS and the ID field attribute field within the subscriber service profile references (or points to) the AS profile that contains the ID field attribute. Accordingly, in an aspect, a single AS profile can be employed for disparate servers, whether the servers are different instances of the same type of server or different type of servers.

A procedure includes one or more of a set of computer-executable code instruction or a set of data objects. The procedure is re-configurable and extensible—the set of computer-executable code instructions and the set of data objects each can be re-configured (e.g., parameter values or logical variable re-defined); augmented; or reduced. A provisioning server (not shown) in packet-based core network 110 can provision the AS profile and an instance of the procedure(s) therein, such instance defines computer-executable code instructions that are part of the procedure(s) and available data objects related to the procedure(s). While the actual implementation of an AS profile (e.g., AS profile P 158$_P$, with P a positive integer) can vary based at least on how such data object is defined and utilized in the centralized repository (e.g., HSS in 3GPP IMS core network) procedure(s) within the AS profile can include the group of example instructions and data listed below; particular format of the example instructions and data is dictated by such implementation (RDBMS, ODBMS, XML, etc.):

(a) Time_To_Live—Numerical parameter that established a time interval that defines expiration of the AS profile. For instance, the value of Time_To_Live parameter determines the time interval is the time span allotted to the AS profile before a session control component (e.g., S-CSCF in 3GPP IMS core network) is allowed to re-acquire (e.g., re-download) the AS Profile to refresh a local copy in the session control component.

It should be appreciated that such data object is unavailable is conventional systems. Moreover, in conventional systems, timers available to a session control component are afforded by a subscriber service profile and configured manually for the session control component. In contrast, a timer such as "Time_To_Live" timer is available to a session control component automatically after an AS profile that defines such timer is automatically acquired by the session control component. Since control layers such as control layer 114 conventionally include $10^2$-$10^3$ session control components, automatic configuration described herein increases efficiency of data provisioning dramatically while reducing error incidence, usually related with processes that demand manual intervention.

(b) Transaction_Bypass—If set to yes, a session control component (e.g., S-CSCF in 3GPP IMS core network) does not route SIP messages for a current transaction via an identified AS. The subject data object establishes behavior of the session control component determines whether or not the session control component routes SIP messages (e.g., responses) in the same transaction to the AS. While reference is made to SIP messages, substantially the same data object can be defined for session establishment protocols other than SIP.

(c) Dialog_Bypass—If set to yes, a session control component (e.g., S-CSCF in 3GPP IMS core network) is not enable to route other SIP messages for a current dialog through an identified application server.

(d) Invite_Message_Retransmission_Limit—A positive integer that determines a number of times a session control component (e.g., S-CSCF in 3GPP IMS core network) retransmits an INVITE message to an AS instance. It is noted that while reference is made in the subject data object to an INVITE which is typical of SIP, the subject data object can be defined in substantially the same manner for other forms of request indications to establish a session within a packet-base core network. For instance, the subject data object can be defined for request indications that include session setup signaling within the H.225 protocol of the H.323 suite of signaling protocols.

(e) Non-Invite_Message_Retransmission_Limit—A positive integer that governs how many times an S-CSCF retransmits a Non-Invite message to an application server instance. It is noted that while reference is made in the subject data object to an NON-INVITE which is typical of SIP, the subject data object can be defined in substantially the same manner for other forms of request indications to establish a session within a packet-base core network. For instance, the subject data object can be defined for request indications that include session setup signaling within the H.225 protocol of the H.323 suite of signaling protocols.

(f) AS_Retry_Limit—A positive integer that conveys to a session control component (e.g., S-CSCF in 3GPP IMS core network) a number of alternate application server instances (e.g., an AS in a disparate physical location or logical location) that the session control component should re-try if the session control component sends a SIP message to an AS instance but receives no response. The subject data object establishes behavior of the session control component if it is not able to reach an instance of an AS; thus, the AS profile enhances conventional network systems that fails to afford such behavior.

(g) AS_HB—Boolean flag that indicates whether a session control component (e.g., S-CSCF in 3GPP IMS core network) is enabled to heartbeat each instance of the AS. The subject data object establishes behavior of the session control component to determine whether or not the session control component heartbeats the AS. In addition, a supplemental data object or instruction can be defined to determine a protocol or method employed for the heartbeats.

(h) AS_ST_Use—Boolean variable, or flag, that governs whether a session control component (e.g., S-CSCF in 3GPP IMS core network) supports session timers for dialogs to the specific AS. The subject data object establishes behavior of the session control component that determines whether session timers are to be supported for dialogs involving the AS; thus, the AS profile enhances conventional network systems that fails to afford such behavior.

(j) Comment—String variable that can list actual application server instances to which the AS Profile is applicable.

Figure 2:
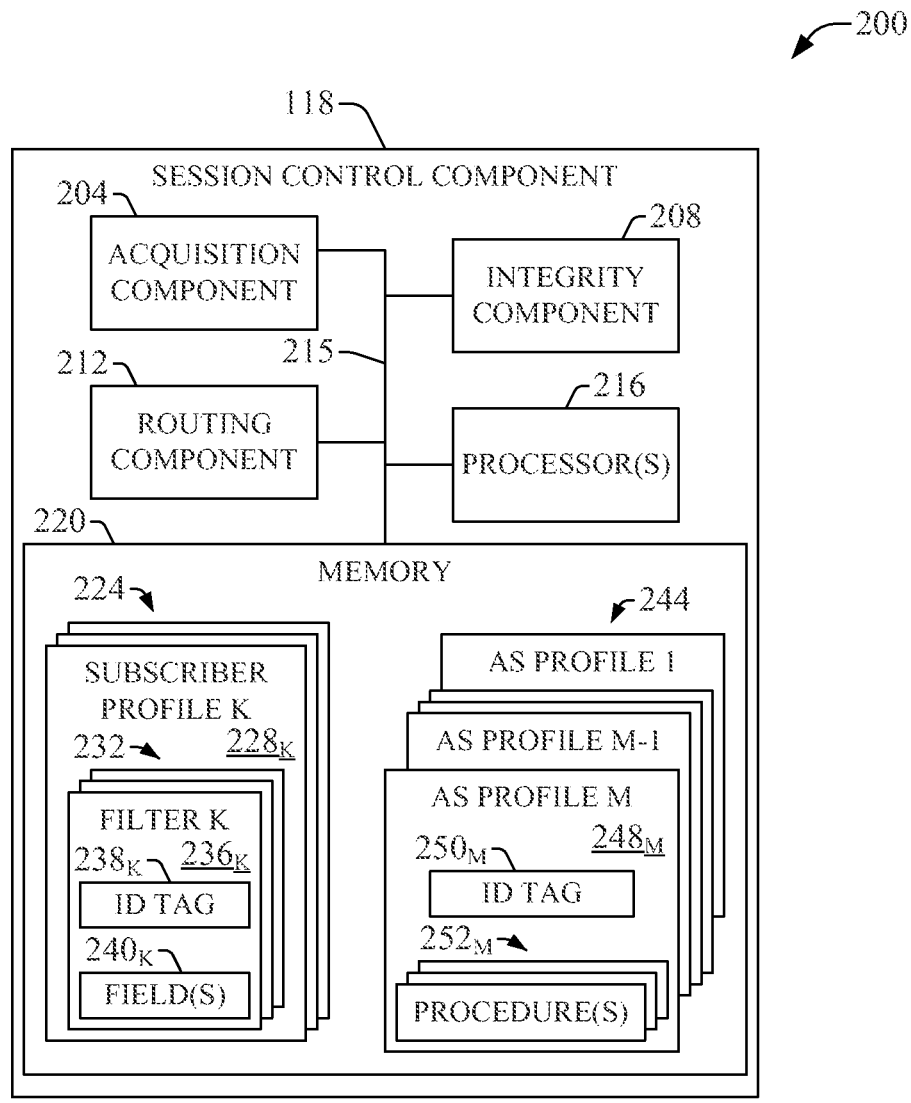
FIG. 2 illustrates a block diagram of an example embodiment of a session control component that is part of example network system in FIG. 1 and enables and exploits various aspects described herein.

The session control component 118 can acquire a subscriber service profile from the set of subscriber profiles 134 in response to registration of the subscriber device with an access network (not shown). Prior to activating the subscriber device, for example, when a subscriber who operates the subscriber device requests service from a network operator which manages packet-based core network 110, the network operator assigns the session control component 118 (e.g., an S-CSCF node) to the subscriber device. Based on such assignment, the session control component 118 can respond to registration (power on, roaming, inter-RAT handover, etc.) of the assigned subscriber device on the access network (not shown). Session control component 118 retains an acquired subscriber profile in memory storage (register, database, file(s), etc.). The acquired subscriber profile includes one or more filter criteria that, in addition to comprising at least one field that identifies an AS, include an ID tag that identifies an AS profile related to the identified AS. In certain embodiments, e.g., example embodiment 200 illustrated in FIG. 2, session control component 118 includes an acquisition component 204 that can extract a set of subscriber service profiles 224 and store such set in a memory 220, which is local to the session control component 118.

In an aspect of the subject disclosure, in response to acquisition of the subscriber profile and based on one or more ID tags (e.g., ID tag $238_K$, with K a positive integer) in a set of filter criteria (e.g., set 232, which comprises filter K $236_K$, with ID tag $238_K$ and field(s) $240_K$) included in the subscriber service profile (e.g., subscriber profile K $228_K$), the session control component 118 automatically acquires a group of AS profiles (e.g., set of AS profiles 244, which includes AS profile M $248_M$ with M a positive integer) and data stored therein (e.g., ID tag $250_M$ and procedure(s) $252_M$). Accordingly, the group of AS profiles is specific to the subscriber profile that is acquired by session control component 118; thus, data in each AS profile within the group of AS profiles is specific to the subscriber device linked to the subscriber profile. Numerous aspects of interaction of session control component 118 with one or more instances of an AS associated with an AS profile (e.g., AS profile M $248_M$) in the group of AS profiles is thus particular to the subscriber device. The group of AS profiles is retained in memory storage that can be part of session control component 118 or that is functionally coupled thereto. As an example, memory storage can be memory 220.

Acquisition of a group of AS profiles can include features that promote acquisition integrity. For at least one AS ID tag (e.g., AS ID tag $22_{8K}$) included in an acquired subscriber profile (e.g., subscriber profile $220_K$), session control component 118 can verify that at least one AS profile identified by the at least one AS ID tag is acquired (e.g., retrieved or uploaded) and, in case it has been acquired, the at least one AS profile is free from error. In addition, session control component 118 can verify that the at least one AS profile is current, rather than expired. Expiration can be determined, for example, by state (e.g., elapsed time or clock counts) of a timer that measures time remaining for the at least one profile to be valid. Time allotted to the at least one AS profile to be valid, or lifetime of the at least one AS profile, is configurable and specific to the at least one AS profile; as described supra, a numerical parameter (e.g., "Time-To-Live" instruction) in the at least one AS profile can dictate the lifetime of the at least one AS profile. In case the at least one AS profile has not been acquired properly or it has expired, session control component 118 can re-acquire the at least one AS profile. Alternatively, in case the at least one AS profile has not been acquired, session control component 118 can extract the at least one AS profile from the centralized network repository 130, which can be embodied in an HSS in scenarios in which packet-based core network 110 is embodied in a 3GPP IMS core network. In certain scenarios, session control component 118 can perform an integrity cycle for each AS profile identified in the acquired subscriber profile, while in alternative or additional scenarios, a predetermined sub-set of one or more AP profiles is verified. In certain embodiments, e.g., example embodiment 200 illustrated in FIG. 2, session control component 118 includes an integrity component 208 that can perform the integrity cycle and convey signaling to acquisition component 204 to extract specific AS profile(s) from memory 220, in response to outcome of the integrity cycle in accordance with aspects described supra.

Based at least on an ID tag that identifies an AS profile, session control component 118 can access the AS profile, which determines details of the interaction of the session control component 118 with the AS linked to the AS profile. As described supra, such details of the interaction, and thus the interaction itself, are specific to the subscriber device that is the originating point of a session or the terminating point of a session. It should be noted that such access to the AS profile is unavailable in conventional system networks, such as standardized 3GPP IMS core network. In response to accessing the AS profile, session control component 118 can route a session linked to a request for service in accordance with at least one procedure that is part of the AS profile that is accessed. In certain embodiments, e.g., example embodiment 200 illustrated in FIG. 2, session control component 118 includes a routing component 212 that accesses the AS profile. In addition, routing component 212 can implement (e.g., execute), at least in part, the at least one procedure that is part of the AS profile and dictates details of the interaction, and thus the interaction itself, with an application server instance (which can be part of the set of application server(s) 126, for example).

In example embodiment 200, the session control component 118 includes one or more processor(s) 216 configured to provide, or that provide, at least part of the described functionality of the various components within the session control component 118. Processor(s) 216 can execute computer-executable code instructions (not shown in FIG. 3) stored in memory 220 to provide the described functionality of session control component 118. Such computer-executable code instructions can include program modules or software application(s) or firmware application(s) that implement, for example, various of the methods described in the subject disclosure and associated, at least in part, with functionality of session control component 118. It should be appreciated that each of the one or more processor(s) 216 can be a centralized element or a distributed element. In distributed scenarios, the one or more processor(s) 216 can be part of the various components that comprise session control component 118. Memory 220 also stores data, such as data structures, data objects, metadata, numerical variables and parameters, logical variables, or the like. In addition, processor(s) 216, memory 220, and the various components within session control component 118 can exchange data and signaling via bus 215. In an aspect, bus 215 can be embodied in one or more of a system bus, an address bus, a message bus, a memory bus, a power bus in accordance with various hardware, firmware, or software implementations.

Figure 3:
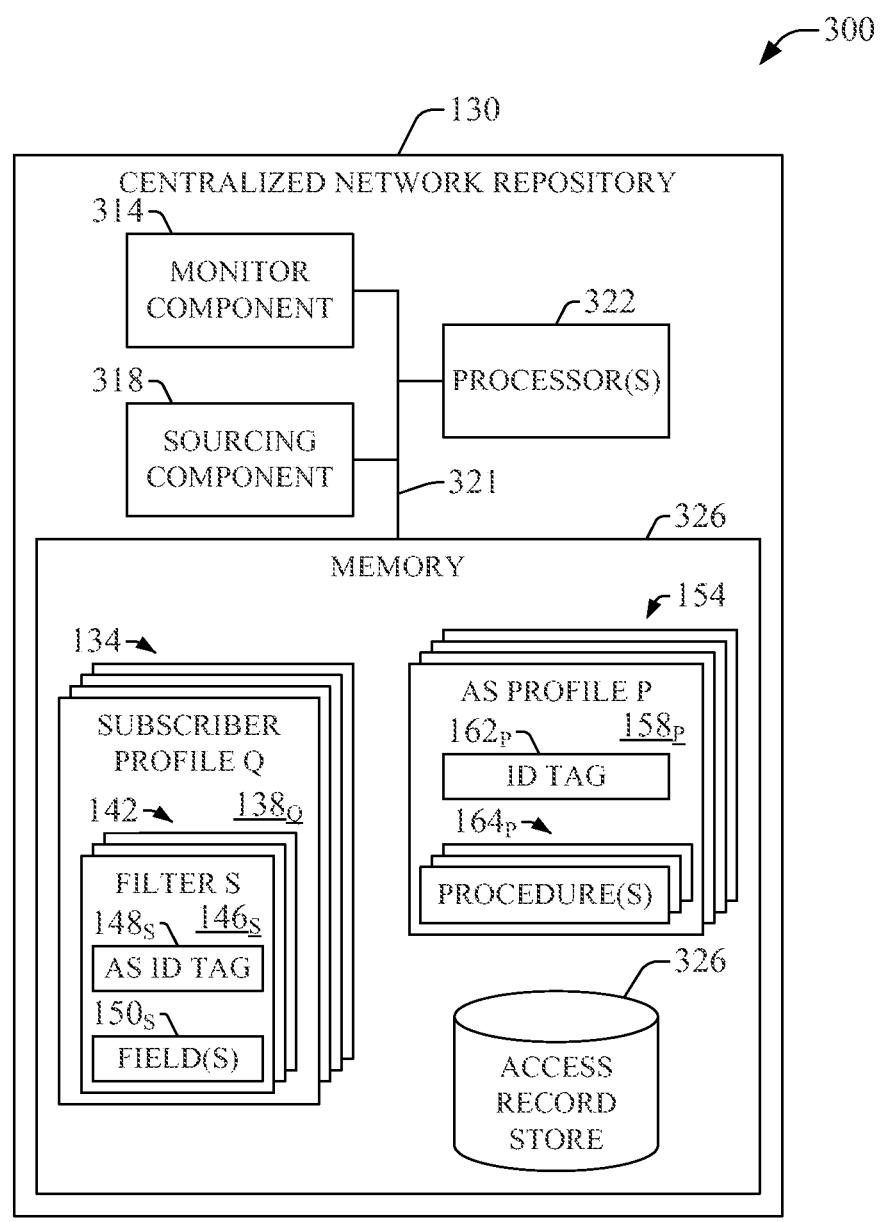
FIG. 3 presents a block diagram of an example embodiment of a centralized repository that is part of the example network system in FIG. 1 and is enabled to supply one or more AS profiles in accordance with aspects described herein.

In one or more embodiments, such as example embodiment 300 illustrated in FIG. 3, the centralized network repository 130 can supply one or more AS profiles to session control component 118; the one or more AS profiles are supplied automatically (e.g., without human intervention). The one or more AS profiles can be supplied in response to generation thereof. In example embodiment 300, monitor component 314 can detect generation of an AS profile and, in response, monitor component 314 can instruct sourcing component 318 to deliver the AS profile to the session control component 118. In an aspect, monitor component 314 can detect generation of an AS profile by probing a memory storage that retains a set of AS profiles. At least two distinctions with respect to the conventional network systems are application to such delivery of AS profile(s) in response to generation thereof. First, as described supra, conventional network systems lack centralized AS profiles as described herein. Second, as described supra, generation of an AS profile can be overloaded with respect to an AS for which the AS profile regulates details of the interaction of the session control component (e.g., S-CSCF node in 3GPP IMS core network) with the AS. Different subscriber devices can have disparate AS profiles associated with the same AS; subscriber devices can be linked to a specific subscriber or to a specific subscriber segment (landline service subscribers, cellular service subscribers, femtocell service subscribers, etc.).

In addition or in the alternative, the one or more AS profiles can be supplied in response to changes to content of one or more AS profiles or modifications to AS ID tags. In example embodiment 300, centralized network repository 130 includes a monitor component 314 that can track the set of AS profiles that are acquired (e.g., retrieved or extracted) by the session control component 118. In an aspect, as part of tracking such set, monitor component 314 creates a record of an AS profile that is acquired by the session control component 118; the record can be created (e.g., issued and stored) in an access record store 114 within a memory 326 that is part of the centralized network repository 130. After creation of the record of the AS profile, and in response to such creation, monitor component 314 probes state of the AS profile and an AS ID tag that uniquely identifies the AS profile. As described supra, the AS ID tag can reside within a filter criterion (e.g., an IFC in a 3GPP IMS network) in a subscriber profile and in the AS profile. In an aspect, monitor component 314 can probe the AS profile and the related AS ID tag in polling mode, wherein monitor component 314 polls memory storage (set of registers, a database, etc.) that retains the AS profile or a disparate memory storage that contains a group of subscriber profiles. In polling mode, monitor component 314 can poll such memory storage periodically, at predetermined times, or based on occurrence of predetermined events. In situations in which monitor component 314 establishes, based on the tracking, that the AS profile or the AS ID tag, or both, are updated, monitor component 314 can deliver signaling (a directive, a set of bits, a lightweight file, etc.) that indicates such an update to sourcing component 318. In response to such signaling, sourcing component 318 can supply (e.g., retrieve and deliver) data related to the updated AS profile (e.g., AS profile P $158_P$) or the updated AS ID tag (e.g., AS ID tag $148_S$) to the session control component 118, or a component therein (e.g., acquisition component 204). Data related to the updated AS profile can be a portion (e.g., an instruction or a data element) of the AS profile that is updated. In addition, such data can encompass the entire updated AS profile.

In the illustrated example embodiment, centralized network repository 130 includes one or more processor(s) 322 configured to provide, or that provide, at least part of the described functionality of monitor component 314 and sourcing component 318. The one or more processor(s) 322 can execute computer-executable code instructions (not shown in FIG. 3) stored in memory element 326 (access record storage 326) to provide the described functionality of session control component 118. Such computer-executable code instructions can include program modules or software application(s) or firmware application(s) that implement, for example, various of the methods described in the subject disclosure and associated, at least in part, with functionality of session control component 118. It should be appreciated that each of the one or more processor(s) 322 can be a centralized element or a distributed element. In distributed scenarios, the one or more processor(s) 322 can be part of the various components that comprise centralized network repository 130. Memory 326 also stores data, such as data structures, data objects, metadata, numerical variables and parameters, logical variables, or the like. In addition, processor(s) 322, memory 326, and the various components within centralized network repository 130 can exchange data and signaling via bus 321. In an aspect, bus 321 can be embodied in one or more of a system bus, an address bus, a message bus, a memory bus, a power bus in accordance with various hardware, firmware, or software implementations.

In an aspect of the subject disclosure, exchange of data amongst the packet-base core network 110 and the centralized network repository 130 (e.g., HSS in an IMS core network) is performed through a new Diameter message. The new Diameter message enables requesting the AS profile and delivering the AS profile through a reference point in the interface 127 between a control layer that includes the session control component 118 and the centralized network repository 130. Interface 127 can be embodied in at least one of conventional link(s) (e.g., a fiber optic link, an Ethernet link, a T1/E1 line, wireless link(s) . . . ), reference link(s) (e.g., Gi, Gn . . . ), or one or more components of an access network, which can wireline or wireless and private, semiprivate or public. In scenarios in which the session control layer is a CSCF layer in 3GPP IMS core network and the centralized repository is an HSS, the reference point is the Cx extended reference point.

Based on the description supra, at least the following example advantages of the subject disclosure emerge. A first example advantage is reduction of cost associated with time expended in manual or substantially manual configuration of data, such as subscriber profiles, in a session control component (e.g., S-CSCF, I-CSCF, or P-CSCF in 3GPP IMS core network) or in implementation of remediation procedures associated with errors in configuration stemming from such manual intervention. Reduction of time is afforded by the automated configuration of session control component(s) described herein, and the centralized character of the provisioned AS profiles. While configuration can be effected based in part on a custom Diameter protocol that enables data exchange through a reference point (e.g., Cx for 3GPP IMS core network and HSS) in the interface 127 amongst the packet-based core network 110 and the centralized network repository 130, standardized or conventional protocols for data exchange can be employed. A second example advantage is superior flexibility to configure a session control component and interaction thereof with an application server; in embodiments in which the packet-based core network 110 is a 3GPP IMS core network, the session control component can be one of a S-CSCF node, an I-CSCF node, a P-CSCF node, or a BGCF node). Superiority stems from, in part, customized features of interaction with (e.g., invocation of) disparate ASs, wherein a network operator through the various aspects of the subject disclosure, can customize such features based at least on service provided by an AS, the type of the AS, or both. Moreover, the various aspects or features of configuration of a session control component (e.g., S-CSCF, I-CSCF, or P-CSCF in 3GPP IMS core network) disclosed herein, enable a network operator to specify, for a particular subscriber, particular feature(s) of interaction amongst the session control component and an AS. Accordingly, the various aspects or features of the subject disclosure afford a degree of configuration granularity not available to conventional network systems in connection with at least configuration of interaction amongst S-CSCF node and an AS.

Various aspects of the subject disclosure can be automated through artificial intelligence (AI) methods to infer (e.g., reason and draw a conclusion based upon a set of metrics, arguments, or known outcomes in controlled scenarios), for example, values of variables within at least one procedure in application server(s), schedule(s) for tracking updates to AS profile(s) or related ID tag(s), or the like. Artificial intelligence techniques typically apply advanced mathematical algorithms—e.g., decision trees, neural networks, regression analysis, principal component analysis (PCA) for feature and pattern extraction, cluster analysis, genetic algorithm, or reinforced learning—to a data set; e.g., the collected subscriber intelligence in the case of subscriber segmentation. In particular, one of numerous methodologies can be employed for learning from data and then drawing inferences from the models so constructed. For example, Hidden Markov Models (HMMs) and related prototypical dependency models can be employed. General probabilistic graphical models, such as Dempster-Shafer networks and Bayesian networks like those created by structure search using a Bayesian model score or approximation also can be utilized. In addition, linear classifiers, such as support vector machines (SVMs), non-linear classifiers like methods referred to as "neural network" methodologies, fuzzy logic methodologies also can be employed.

In view of the example system(s) described above, example method(s) that can be implemented in accordance with the disclosed subject matter can be better appreciated with reference to flowcharts in FIGS. 4-7. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein can alternatively be represented as a series of interrelated states or events, such as in a state diagram. Moreover, interaction diagram(s) may represent methods in accordance with the disclosed subject matter when disparate entities enact disparate portions of the methodologies. Furthermore, not all illustrated acts may be required to implement a described example method in accordance with the subject specification. Further yet, two or more of the disclosed methods can be implemented (executed, performed, etc.) in combination with each other, to accomplish one or more features or advantages described herein.

Method(s) disclosed throughout the subject specification and annexed drawings are capable of being stored on an article of manufacture to facilitate transporting and transferring such method(s) to computers or chipsets with processing capability(ies) for execution, and thus implementation, by a processor, or for storage in a memory. In an aspect, one or more processors that enact method(s) described herein can be employed to execute computer-executable code instructions retained in a memory, or any computer-readable or machine-readable medium, to implement method(s) described herein; the code instructions, when executed by the one or more processor implement or carry out the various acts in the method(s) described herein. The computer-executable code instructions, also referred to herein as code instructions, provide a computer-executable framework to enact, or implement, the method(s) described herein.

Figure 4:
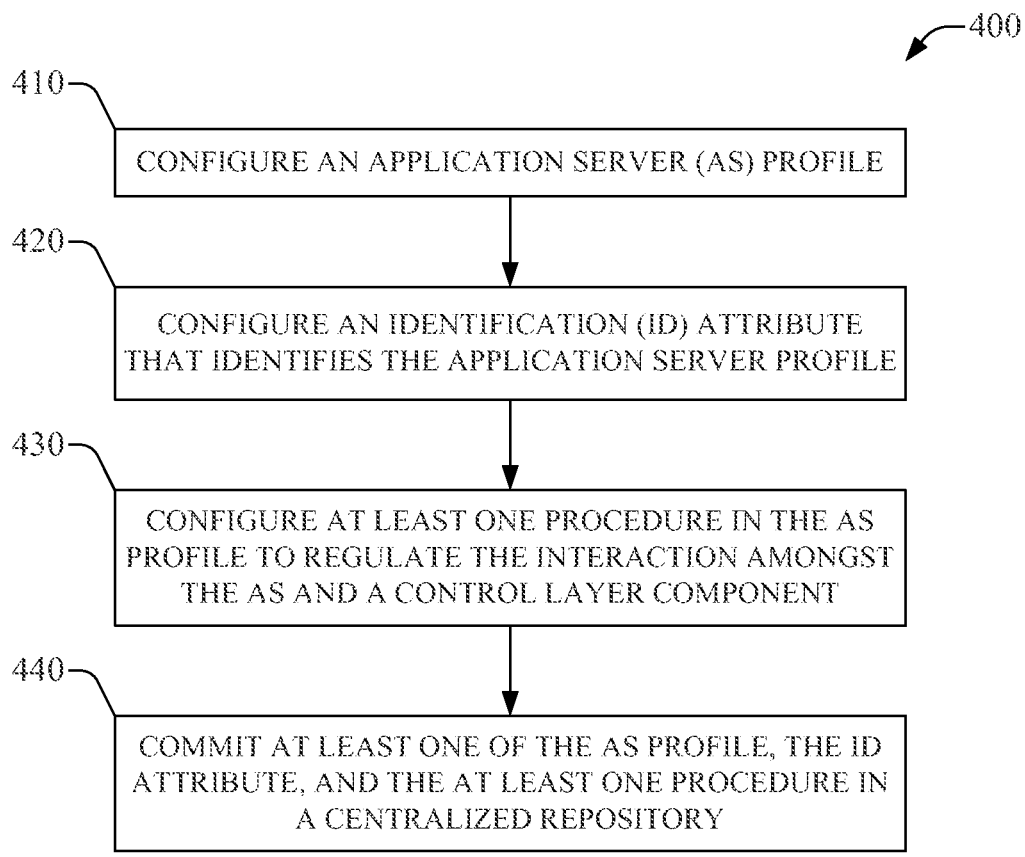
FIG. 4 illustrates a flowchart of an example method for provisioning an AS profile according to aspects described herein.

FIG. 4 illustrates a flowchart of an example method 400 for provisioning an AS profile according to aspects described herein. One or more network nodes (e.g., a provisioning server) in the packet-base network can perform the subject example method. At act 410, an AS profile is configured. At act 420, an ID attribute, or ID tag, that uniquely identifies the AS profile. At act 430, at least one procedure is configured within the AS profile, wherein the at least one procedure regulates the interaction amongst an application server and a session control component (e.g., a S-CSCF node in an IMS core network). The at least one procedure includes at least one of a computer-executable code instruction and data object(s), as described supra; the configuring can include configuring a group of one or more computer-executable code instructions, configuring data object(s) related the group of one or more computer-executable code instructions, or both. At act 440, the AS profile is committed in a centralized repository (e.g., HSS in an IMS core network). Committing the AS profile includes storing the AS profile in the centralized repository and exposing (e.g., making logically available) the AS profile to the session control component.

Figure 5:
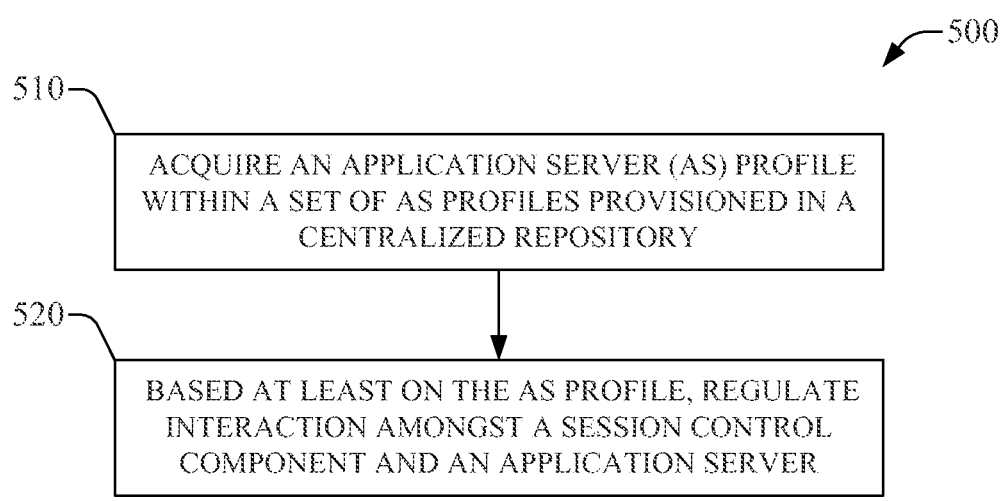
FIG. 5 presents a flowchart of an example method for customizing interaction of a session control component and an application server in a packet-based network according to aspects described herein.

FIG. 5 presents a flowchart of an example method 500 for customizing interaction of a session control component and an application server in a packet-based network according to aspects described herein. In an embodiment, as described supra, the packet-based network can be an IMS core network and the session control component can be a S-CSCF node. In an aspect, the session control component can implement (e.g., execute) the subject example method. At act 510, an AS profile (e.g., AS profile M $138_m$) is acquired, wherein the AS profile is part of a set of AS profiles provisioned in a centralized repository. The AS can be acquired in response to registration of a subscriber with an access network functionally (e.g., communicatively) coupled with the packet-based network (e.g., 110). As described supra, the AS profile includes an ID attribute that uniquely identifies the AS profile. In addition, the AS profile includes at least one data object, wherein the at least one data object comprises a set of instructions (e.g., computer-executable code instructions) or data. At act 520, interaction amongst the session control component and an AS identified in the AS profile is regulated according at least in part to at least one data object in the AS profile. Thus, such interaction is customized at least in part through the at least one data object in the AS profile.

Figure 6:
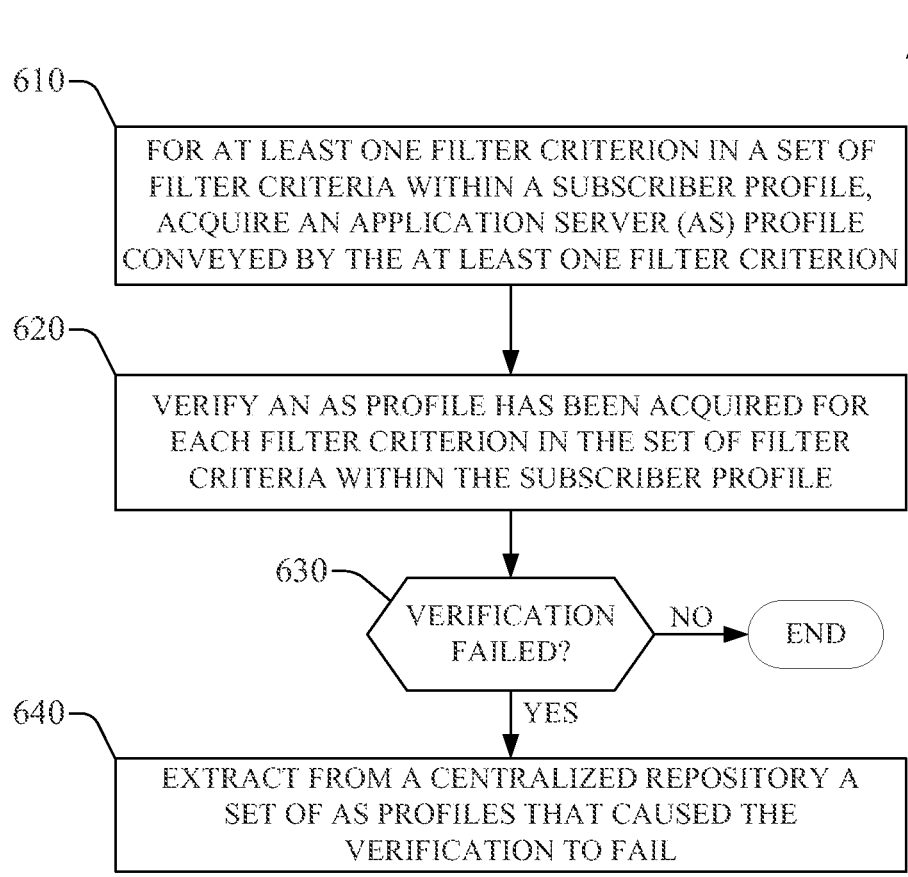
FIGS. 6-7 present flowcharts example methods for acquiring an AS profile according to aspects described herein.
Figure 7:
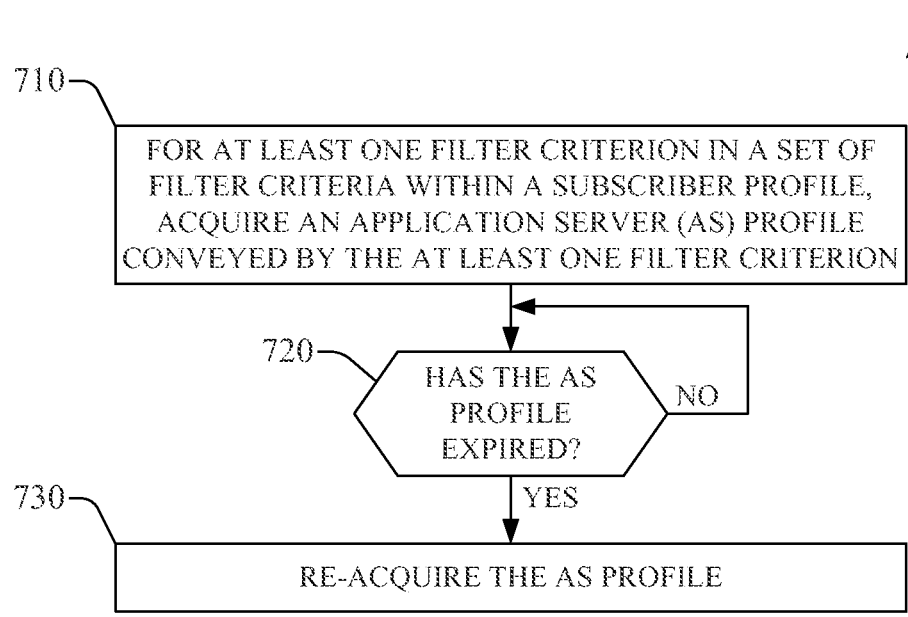

FIGS. 6-7 present flowcharts example methods 600 and 700 for acquiring an AS profile according to aspects described herein. The subject example methods can be enacted by the session control component that implements example method 400; in an aspect, the subject example method can embody act 410. With respect to example method 600, at act 610, for at least one filter criterion (e.g., filter $224_K$) in a set of filter criteria within a subscriber profile (e.g., $220_K$), acquire an AS profile conveyed by the at least one filter criterion. In an aspect, acquiring the AS profile can include retrieving the AS profile from a centralized repository. In another aspect, acquiring the AS profile can include receiving the AS profile from a component (e.g., a database manager component or a component such as sourcing component 318) that manages data (data objects, metadata, numerical variables and parameters, logical variables, etc.) in the centralized repository.

At act 620, it is verified that an AS profile has been acquired for each filter criterion in the set of filter criteria within the subscriber profile (e.g., $220_K$). As an example, the verification can be based at least on inspection of a group of AS profile retained in a memory that is part of or functionally coupled to the session control component that enacts the subject example method. At act 630, it is determined if the verification has failed. In the negative case, flow is terminated, whereas in the affirmative case, flow is directed to act 640, in which a set of AS profiles (e.g., a group of three AS profiles) that caused the verification to fail is extracted from the centralized repository.

With respect to example method 700, at act 710, for at least one filter criterion (e.g., filter $224_K$) in a set of filter criteria within a subscriber profile (e.g., $220_K$), acquire an AS profile conveyed by the at least one filter criterion. The subject act is substantially the same as act 610. At act 720, it is determined if AS profile has expired. In an aspect, determining if the AS profile has expired can be based on monitoring a timer (e.g., a "time-to-live" (TTL) timer) that establishes a time interval during which the AS profile remains committed (e.g., valid or in effect). In an affirmative determination, the AS profile is re-acquired at act 730. Conversely, in case the AS profile has not expired, flow is redirected to act 720.

In example methods 600 and 700, a new or custom Diameter message can be employed to extract an AS profile from the centralized repository (e.g., HSS in an IMS core network), as indicated supra.

Figure 8:
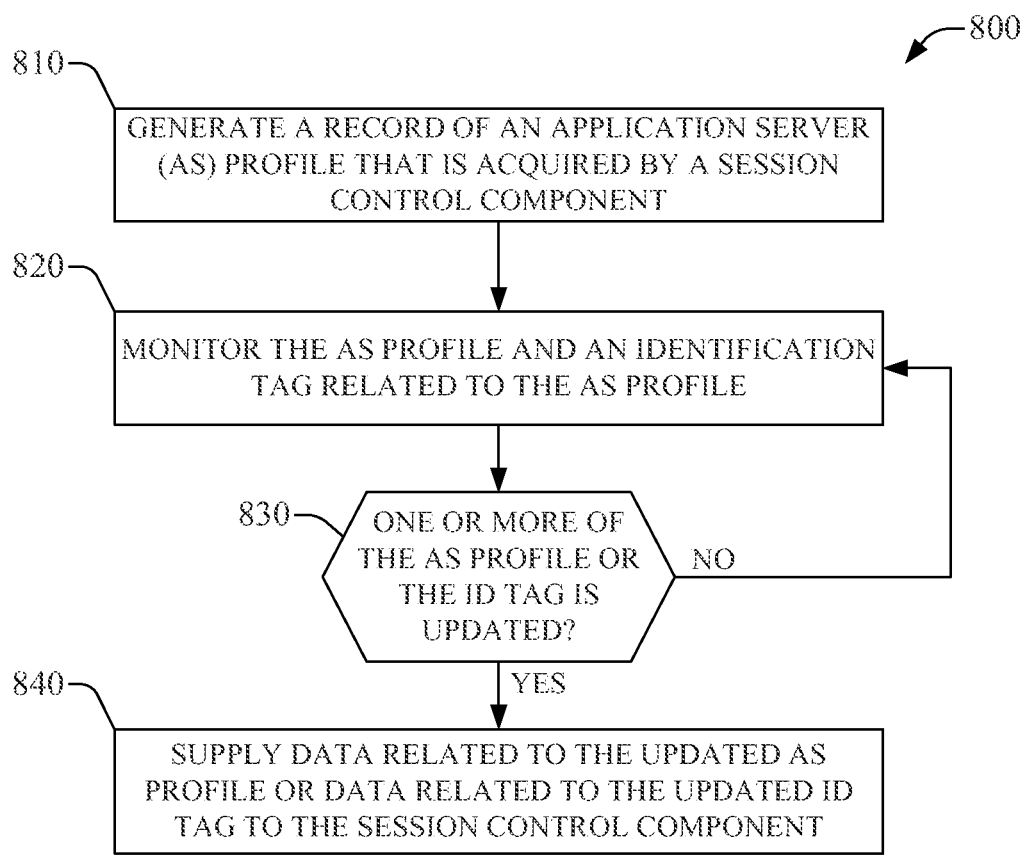
FIG. 8 illustrates a flowchart of an example method for supplying an AS profile or data related thereto according to aspects described herein.

FIG. 8 illustrates a flowchart of an example method 800 for supplying an AS profile or data related thereto according to aspects described herein. The subject example method can be implemented by one or more component (e.g., monitor component 314 or sourcing component 318) in the centralized repository that is the source of the AS profile. The subject example method also can be enacted by one or more processors functionally coupled to the one or more components, and that execute code instructions retained in one or more memory(ies) to provide at least part of the functionality of the one or more network components. At act 810, a record of the AS profile that is acquired by a session control component is generated. The record can be retained in dedicated storage within the centralized repository. At act 820, the AS profile and an ID tag related to the AS profile is monitored. In an aspect, the ID tag uniquely identifies the AS profile and resides within a filter criterion (e.g., an IFC in a 3GPP IMS network) in a subscriber profile. Accordingly, the monitoring can include polling a memory storage (set of registers, a database, etc.) in the centralized repository that retains the AS profile or a disparate memory storage that contains a group of subscriber profiles, wherein each subscriber profile in the group includes one or more filter criteria. At act 830, it is determined if the AS profile or the ID tag, or both, are updated. Such determination can be made based at least on the monitoring in act 820. At act 840, data related to the updated AS profile or the updated ID tag is supplied to the session control component. The data related to the updated AS profile can be a portion (e.g., an instruction or a data element) of the AS profile that is updated. In addition, such data can encompass the entire updated AS profile.

When compared to conventional packet-based networks, example methods 600, 700, and 800 at the very least increase reliability of configuration of, and related provisioning of data to, a session control component by mitigating or avoiding manual intervention during provisioning of the data. In addition, and with respect to conventional systems, example methods 600 and 700 increase reliability of configuration of features of the interaction of the session control component and an AS by automating acquisition of an AS profile and performing integrity checks, or verifications, that can ensure availability of current, or up-to-date, AS profiles.

Figure 9:
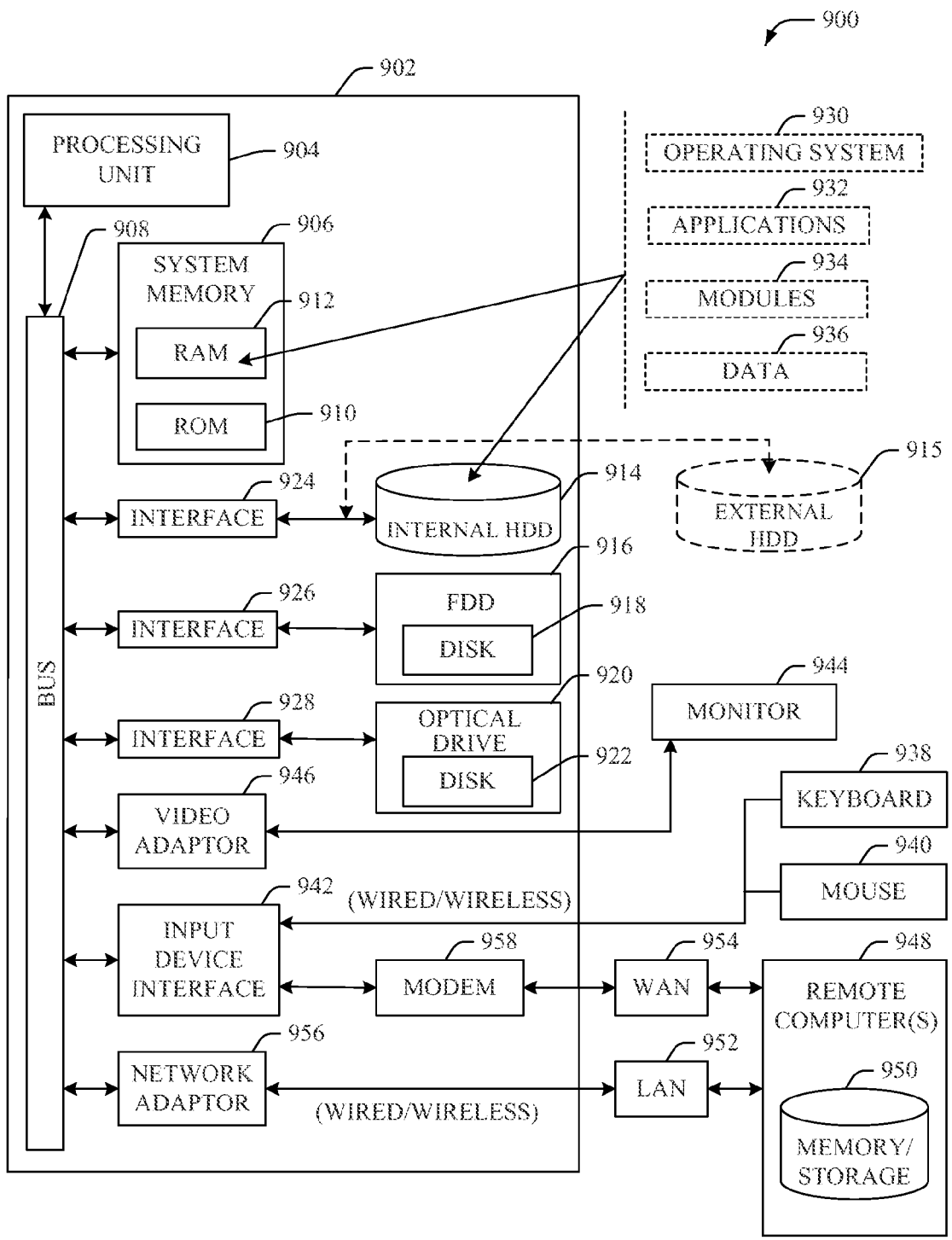
FIG. 9 presents an example computing environment in which the various aspects of the specification can be implemented.

In order to provide additional context for various aspects of the subject specification, FIG. 9 and the following discussion are intended to provide a brief, general description of a suitable computing environment 900 in which the various aspects of the specification can be implemented. While the specification has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the example environment 900 for implementing various aspects of the specification includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), or an external HDD 915 can be present in addition to internal HDD 914, a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the specification.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the specification can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adapter 956 may facilitate wired or wireless communication to the LAN 952, which may also include a wireless access point disposed thereon for communicating with the wireless adapter 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are example and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 8 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
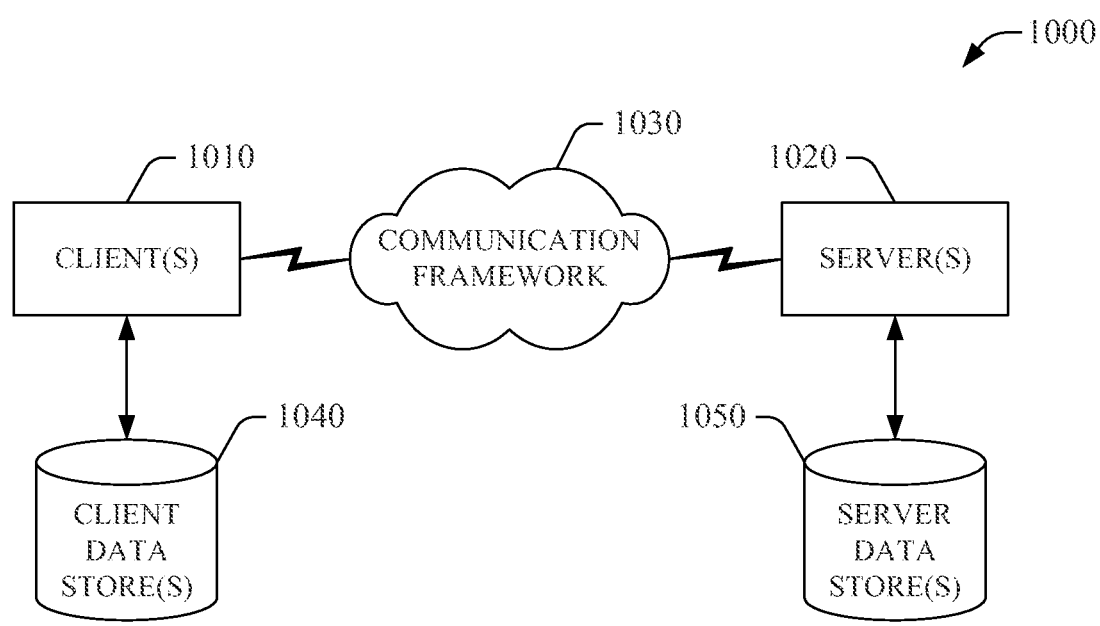
FIG. 10 presents a schematic block diagram of an example computing environment in accordance with aspects described herein.

FIG. 10 illustrates a schematic block diagram of an example computing environment 1030, in accordance with aspects described herein. The system 1000 includes one or more client(s) 1010. The client(s) 1010 can be hardware and/or software (e.g., threads, processes, computing devices). The system 1000 also includes one or more server(s) 1020. Thus, system 1000 can correspond to a two-tier client server model or a multi-tier model (e.g., client, middle tier server, data server), amongst other models. The server(s) 1020 can also be hardware and/or software (e.g., threads, processes, computing devices). The servers 1020 can house threads to perform transformations by employing the subject innovation, for example. One possible communication between a client 1010 and a server 1020 may be in the form of a data packet transmitted between two or more computer processes.

The system 1000 includes a communication framework 1030 that can be employed to facilitate communications between the client(s) 1010 and the server(s) 1020. The client(s) 1010 are operatively connected to one or more client data store(s) 1040 that can be employed to store information local to the client(s) 1010. Similarly, the server(s) 1020 are operatively connected to one or more server data store(s) 1050 that can be employed to store information local to the servers 1020.

It is to be noted that aspects, features, or advantages of the subject innovation described in the subject specification can be exploited in substantially any wireless communication technology. For instance, 4G technologies, Wi-Fi, WiMAX, Enhanced GPRS, 3GPP LTE, 3GPP2 UMB, 3GPP UMTS, HSPA, HSDPA, HSUPA, GERAN, UTRAN, LTE Advanced. Additionally, substantially all aspects of the subject innovation as disclosed in the subject specification can be exploited in legacy telecommunication technologies; e.g., GSM. In addition, mobile as well non-mobile networks (e.g., internet, data service network such as IPTV) can exploit aspect or features described herein.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification and annexed drawings, terms such as "store," "data store," "data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ES-DRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein can be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ).

What has been described above includes examples of systems and methods that provide advantages of the subject innovation. It is, of course, not possible to describe every conceivable combination of components or methodologies for purposes of describing the subject innovation, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
   receiving, by a system comprising a processor, subscriber service profile data from a data store, wherein the subscriber service profile data represents a set of filter criteria and a filter criterion of the set of filter criteria comprises identifier tag data that facilitates a determination of an application server profile associated with an application server;
   based on the identifier tag data, receiving, by the system, application server profile data from the data store, wherein the application server profile data is indicative of the application server profile and comprises procedure data that is employable to regulate an interaction between a session control device and the application server; and
   initiating, by the system, an integrity cycle process that assesses the application server profile data.

2. The method of claim 1, wherein the integrity cycle process comprises a determination of a validity of the application server profile data.

3. The method of claim 2, wherein the application server profile data is first application server profile data and the method further comprises:
   in response to determining that the application server profile data is not valid, directing, by the system, request data to the data store, wherein the request data is indicative of a request for second application server profile data associated with the identifier tag data.

4. The method of claim 1, wherein the performing comprises determining an error in the application server profile data.

5. The method of claim 1, wherein the receiving the application server profile data comprises receiving a data object that specifies a time interval that defines expiration of the application server profile.

6. The method of claim 1, wherein the receiving the application server profile data comprises receiving
   a data object that specifies that a communication of a session initiation protocol message via the application server is allowed.

7. The method of claim 1, wherein the receiving the application server profile data comprises receiving a data object that specifies that a communication of a session initiation protocol message via the application server is prohibited.

8. The method of claim 6, wherein the data object is a first data object and the receiving the application server profile data comprises receiving a second data object that specifies number of retransmissions associated with the session initiation protocol message.

9. A system, comprising:
   a memory to store instructions; and
   a processor, coupled to the memory, that facilitates execution of the instructions to perform operations comprising:
   receiving, from a data store, information indicative of a subscriber service profile of a set of subscriber service profiles and an application server profile of a set of application server profiles, wherein the subscriber service profile specifies a set of filter criteria, wherein a filter criterion of the set of filter criteria comprises field attribute data that identifies an application server, and wherein the application server profile specifies a procedure that facilitates an interaction between the application server and a session control device; and
   based on application of an integrity cycle procedure, verifying that the session control device has received, from the data store, a subset of the set of application server profiles linked to the set of the filter criteria.

10. The system of claim 9, wherein the application server profile is linked to the subscriber service profile based on identifier tag data.

11. The system of claim 9, wherein the verifying comprises determining a validity of the subset of the set of application server profiles.

12. The system of claim 11, wherein the operations further comprise:
   in response to determining that the subset of the set of application server profiles are invalid, receiving, from the data store, update data to update the subset of the set of application server profiles.

13. The system of claim 9, wherein the verifying comprises determining an error in the subset of the set of application server profiles.

14. The system of claim 9, wherein a portion of the information that represents the application server profile data comprises a data object that specifies a time interval that defines an expiration of the application server profile.

15. The system of claim 9, wherein a portion of the information that represents the application server profile data comprises a data object that represents an authorization for a communication of a session initiation protocol message between the session control device and the application server.

16. The system of claim 9, wherein a portion of the information that represents the application server profile data comprises a
   data object that disallows routing of a session initiation protocol message between the session control device and the application server.

17. The system of claim 9, wherein the session control device is a serving control session control function node device.

18. A computer-readable storage device comprising instructions that, in response to execution, cause a system comprising a processor to perform operations, comprising:
   receiving, from a data store, subscriber service profile data indicative of a set of filter criteria, wherein a filter criterion of the set of filter criteria comprises identifier tag data that facilitates a determination of an application server profile associated with an application server;
   based on the identifier tag data, receiving, from the data store, application server profile data indicative of the application server profile of a set of application server profiles, wherein the application server profile data comprises procedure data that is employable to regulate an interaction between a session control device and the application server; and initiating an integrity cycle to facilitate an assessment of the application server profile data.

19. The computer-readable storage device of claim 18, wherein the operations further comprise:

verifying a validity of the application server profile data.

20. The computer-readable storage device of claim 18, wherein the application server profile data comprises a data object that specifies a time period during which the application server profile is valid.

* * * * *